United States Patent [19]

Greenberg

[11] 3,840,120

[45] Oct. 8, 1974

[54] APPARATUS FOR SEPARATING PARTICLES FROM LIQUID

[75] Inventor: Donald K. Greenberg, Rockford, Ill.

[73] Assignee: Barnes Drill Co., Rockford, Ill.

[22] Filed: Mar. 5, 1973

[21] Appl. No.: 337,907

[52] U.S. Cl. ............... 210/167, 210/167, 210/197, 210/258, 210/298, 210/396
[51] Int. Cl. ................... B01d 21/00, B01d 33/02
[58] Field of Search ....... 210/167, 73, 84, 195, 106, 210/197, 407, 161, 298, 258, 172, 333, 396, 354

[56] References Cited
UNITED STATES PATENTS

| | | | |
|---|---|---|---|
| 2,782,928 | 2/1957 | Anderson | 210/298 X |
| 3,334,749 | 8/1967 | Ladd | 210/298 X |
| 3,371,913 | 3/1968 | Schryver | 210/333 X |
| 3,433,361 | 3/1969 | Ades | 210/298 X |
| 3,450,266 | 6/1969 | Allen | 210/167 |
| 3,540,588 | 11/1970 | Estabrook | 210/298 |
| 3,596,769 | 8/1971 | Baldwin | 210/298 |
| 3,784,017 | 1/1974 | Arnold et. al. | 210/354 |

*Primary Examiner*—Theodore A. Grange
*Attorney, Agent, or Firm*—Wolfe, Hubbard, Leydig, Voit & Osann, Ltd.

[57] ABSTRACT

A pump delivers dirty liquid in a drag tank to a hydroclone separator which removes particles from the liquid. Telescoped rotatably over the suction line of the pump is a tubular screen which filters large chips out of the dirty liquid before the liquid passes into the pump, there being a scraper positioned alongside the screen for brushing accumulated chips off of the screen as the latter rotates.

3 Claims, 5 Drawing Figures

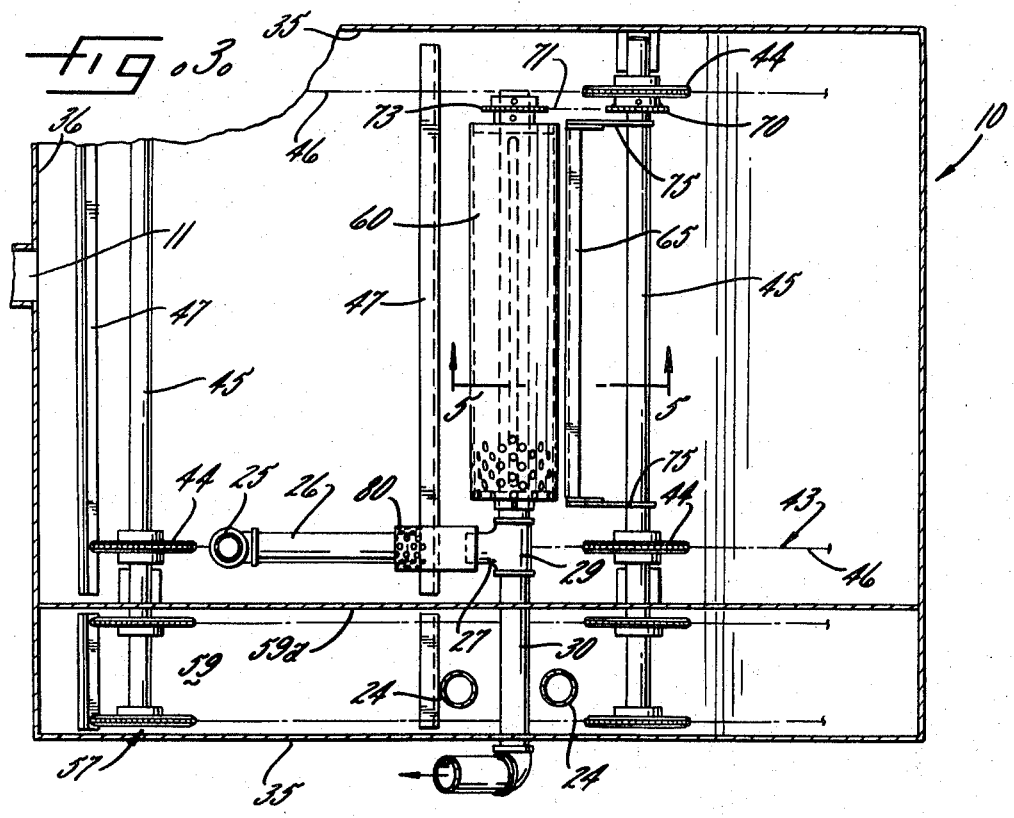
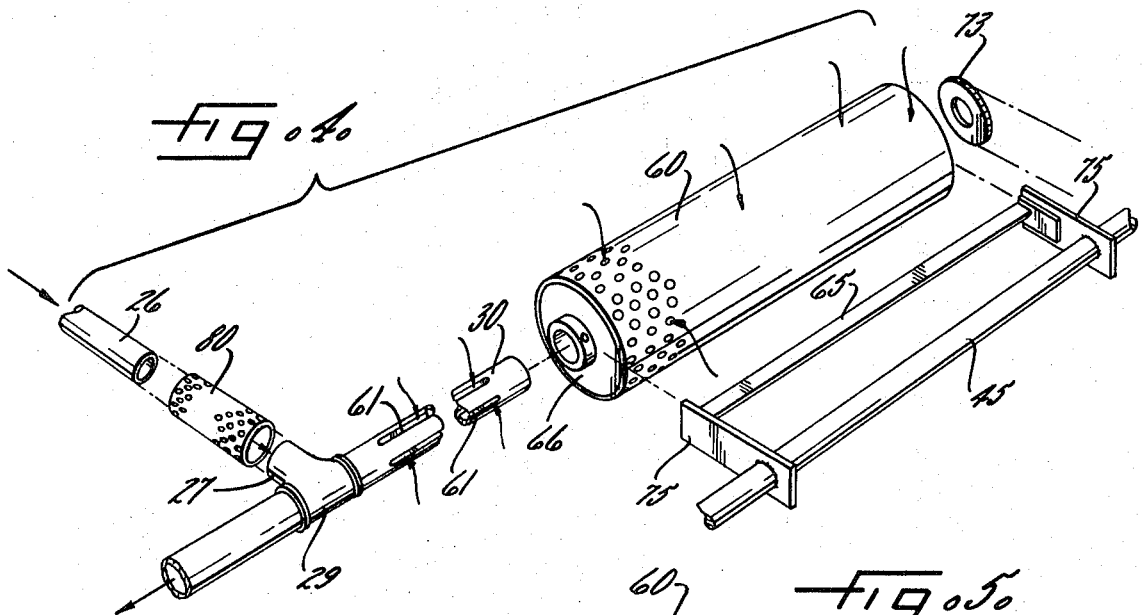
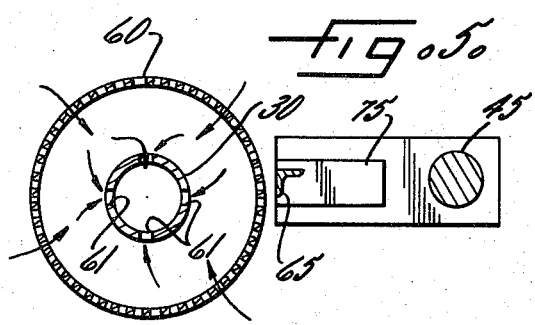

APPARATUS FOR SEPARATING PARTICLES FROM LIQUID

BACKGROUND OF THE INVENTION

This invention relates to apparatus for separating chips and other solid particles from a dirty liquid such as a machine tool coolant and for delivering a flow of clean liquid to a using system. More particularly, the invention relates to apparatus of the same general type as disclosed in Estabrook U.S. Pat. No. 3,540,588 in which the dirty liquid is sucked from a settling tank by a pump and is delivered under pressure to a hydroclone separator which removes the particles from the liquid and delivers a flow of clean liquid to the using system. In accordance with conventional practice, the output of the separator is established so as to be somewhat greater than the needs of the using system and thus an excess flow of clean liquid is returned from the separator to the tank for subsequent re-cycling through the separator.

SUMMARY OF THE INVENTION

The primary aim of the present invention is to provide new and improved apparatus of the above character which more effectively removes large chips and other large particles from the dirty liquid before the latter is sucked into the pump and delivered to the separator thereby to avoid excessive wearing of the pump and to avoid overloading of the separator.

A more detailed object is to achieve the foregoing through the novel provision of a tubular screen which is submerged within the tank and telescoped over the suction line of the pump to filter chips and the like from the dirty liquid before the latter passes into the suction line and flows into the pump.

Still another object is to continuously remove the filtered out chips from the screen so as to avoid clogging of the screen, such removal being effected by power-rotating the screen past a scraper for brushing the chips off of the screen.

A related object of the invention is to use the screen to advantage to enable the discharge pipe for the excess clean liquid to open directly into the tank for the purpose of bleeding air from the separator flow system during start up of the pump and yet, at the same time, to enable the discharge pipe to communicate with the inlet of the pump through the tank without danger of chips being drawn into the pump.

These and other objects and advantages of the invention will become more apparent from the following detailed description when taken in conjunction with the accompanying drawings.

BRIEF DESCRIPTION OF THE DRAWINGS

FIGS. 2 and 3 are fragmentary cross-sections taken substantially along the lines 2—2 and 3—3, respectively of FIG. 1.

FIG. 4 is an exploded perspective view of parts shown in FIGS. 1 to 3.

FIG. 5 is an enlarged cross-section taken substantially along the line 5—5 of FIG. 3.

DETAILED DESCRIPTION OF THE PREFERRED EMBODIMENT

Figure 1:
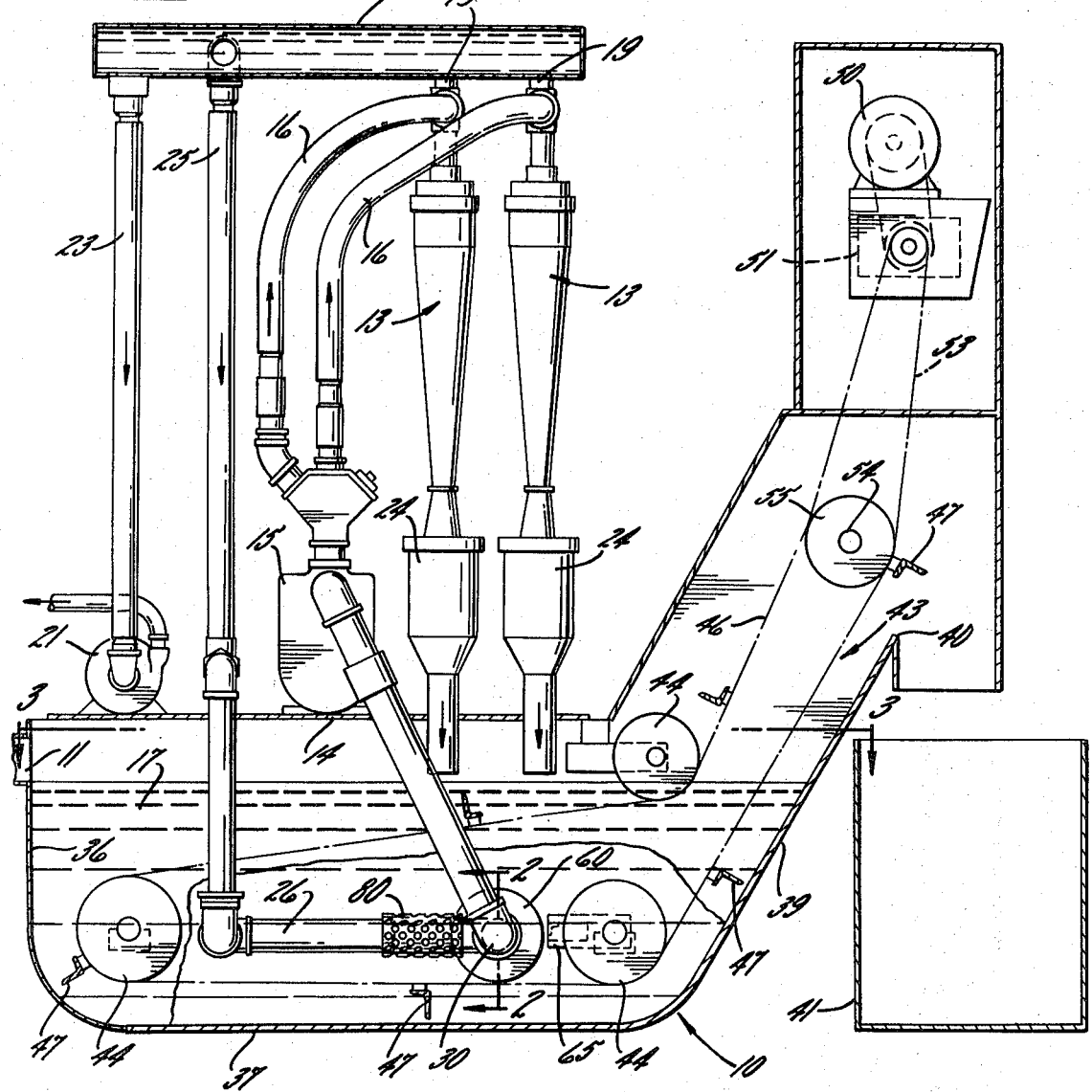
FIG. 1 is a side elevational view of new and improved apparatus embodying the novel features of the present invention, certain parts being broken away and shown in section.

As shown in the drawings for purposes of illustration, the invention is embodied in an apparatus for separating metal chips, swarf, grit and the like from a flow of machine tool coolant delivered to the apparatus from a machine using system served by the apparatus, and for returning a supply of clean coolant to the system. In general, the apparatus includes a settling tank 10 to which the dirty liquid is delivered through a channel-like conduit 11 (FIGS. 1 and 3) opening into one end of the tank. After the chips and the heavier particles have settled into the tank, one or more hydroclone separators 13 (there being two separators shown herein) separate the finer particles from the liquid before the latter is returned to the using system.

Each hydroclone 13 is supported on a platform 14 (FIG. 1) overlying the tank 10 and may be of known basic construction, the same general type of separator being shown in U.S. Pat. No. 3,235,090 to which reference is made for details of construction and operation. A pump 15 having discharge lines 16 sucks dirty liquid from the pool 17 in the tank and delivers the liquid into the upper sections of the hydroclones through the lines 16. From the upper section of each hydroclone, the liquid swirls downwardly around the conical wall in moving toward the apex outlet, creating an inner vortex of clean liquid which flows upwardly out of the upper end of the hydroclone through an outlet pipe 19. The clean liquid is delivered into a header 20 and subsequently is supplied to the using system by an auxiliary pump 21 which communicates with the header by way of a pipe 23. The dirty underflow from the hydroclones is discharged downwardly into the tank 10 from the underflow pots 24 of the hydroclones.

As is customary, the pump 15 supplies the hydroclones 13 with a greater quantity of liquid than is required by the using system. Accordingly, there is an excess flow of clean liquid from the hydroclone outlets 19, and this liquid is returned back downwardly to the tank 10 by a vertical pipe 25 communicating with the header 20. A horizontal pipe 26 (FIGS. 1 and 4) is connected to the lower end of the vertical pipe 25 and has an open end which is submerged within the pool 17. By virtue of the open-ended pipe 26, any air in the hydroclone flow system may be bled therefrom when the pump 15 is first started. The pipe 26 is in line with but spaced from a horizontal pipe 27 forming part of a T-fitting 29 connected into the suction line 30 of the pump. The velocity of the excess liquid carries the latter from the pipe 26 into the pipe 27 and thence into the suction line 30 so that the excess clean liquid may be recirculated through the pump 15 and the hydroclones 13 without directly intermixing with the main body of the dirty liquid in the pool 17.

Figure 2:
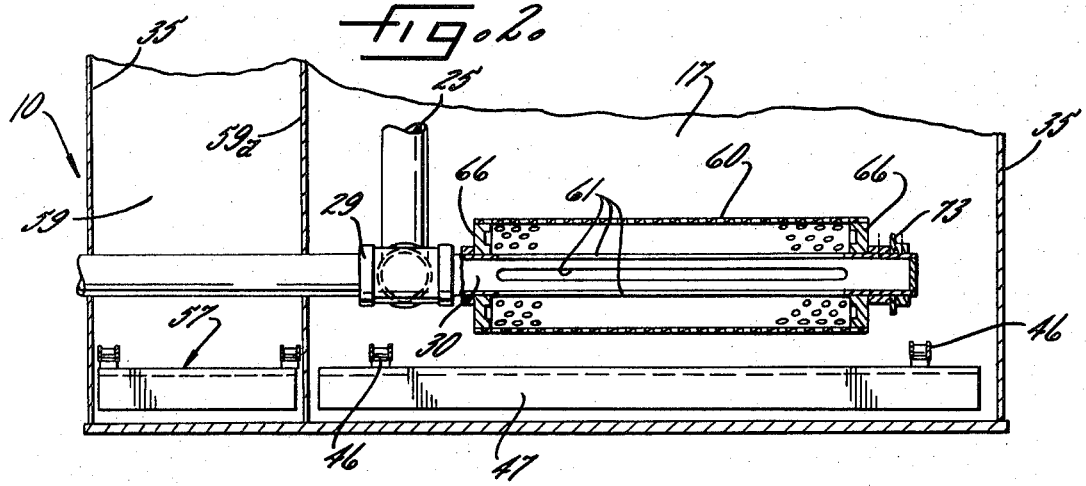

The settling tank 10 is basically a conventional drag tank of sheet metal construction and illustrated most clearly in FIGS. 1 to 3 as having upright side walls 35, a left end wall 36, and a bottom wall which has a horizontal portion 37 forming the bottom of the settling pool 17 and an upwardly inclined portion 39 closing the right end of the tank and terminating in a lip 40 over which accumulated solids are discharged into a receptacle 41 by a drag conveyor 43. The conveyor is supported on sprocket wheels 44 rotatably mounted on horizontal shafts 45 extending between the side walls 35 as shown in FIG. 3. Endless drag chains 46 trained around the sprockets hang down into the pool 17 and carry elongated scrapers or drag bars 47 which move along the bottom 37 of the tank to pick up a quantity of settled-out solids and then move up the incline 39 to carry the solids over the lip 40 for discharge into the receptacle 41. A motor 50 (FIG. 1) drives the conveyor at slow speed through a reducer 51 and a belt drive 53 to an additional shaft 54 journaled rotatably between the side walls 35 and rigidly coupled to a pair of drive sprockets 55 around which the chains 46 are trained. An auxiliary drag conveyor 57 (FIGS. 2 and 3) is disposed side-by-side with the main conveyor 43 and is located in a compartment 59 which is defined within the tank 10 by a partition 59a. The underflow pots 24 of the hydroclones 13 empty into the compartment and thus the fines contained in the underflow may be disposed of without being introduced back into the main pool 17.

By virtue of the drag tank 10, the heaviest chips and particles settle out of and are removed from the dirty liquid before the latter is sucked into the pump 15 and circulated through the hydroclones 13. If, however, the liquid contains chips of relatively low density (e.g., aluminum chips), even comparatively large chips tend to float in the pool and do not readily settle out.

In accordance with the present invention, novel means 60 are provided for separating large floating chips and the like from the dirty liquid before such liquid is sucked into the pump 15 and delivered to the hydroclones 13. As a result, the pumped liquid is relatively free of large chips so as to avoid excessive wearing of the pump and to avoid overloading of the hydroclones.

In this instance, the means 60 comprise a tubular screen which is telescoped over the suction line 30 of the pump 15. As shown in FIGS. 2 and 4, the suction line 30 is submerged within the pool 17 and is formed with four angularly spaced inlet openings in the form of elongated slots 61, the total area of the slots being greater than the cross-sectional area of the suction line to avoid creating a restriction in the line. The screen 60 is cylindrical in shape and completely enshrouds the slots so that any liquid flowing into the suction line 30 must first pass through the screen. Herein, the circular holes through the screen have a diameter of one-eighth inch and are formed on three-sixteenth inch centers. Thus, the screen is effective to filter out large chips but is not readily susceptible to becoming clogged by the accumulation of fine particles in the holes.

Because of the suction in the line 30, filtered-out large chips tend to remain on the screen 60 rather than dropping to the bottom of the tank 10. In furtherance of the invention, the large chips are continuously removed from the screen to prevent the latter from becoming clogged. For this purpose, the screen is power-rotated on the suction line and is continuously moved past a scraper 65 (FIGS. 3 to 5) which serves to brush the chips off of the screen so that the chips ultimately may settle to the bottom of the tank for removal by the drag conveyor 43.

MOre specifically, the screen 60 is rotatably mounted on the suction pipe 30 by a pair of discs 66 (FIG. 2) telescoped rigidly into ends of the screen and journaled on the pipe. To rotate the screen, the sprocket 44 nearest the free end of the suction line 30 carries an additional sprocket 70 (FIG. 3) which is connected by a chain 71 to a sprocket 73 secured to one of the end discs 66 and journaled rotatably on the suction line. Thus, the screen is rotated on the suction line as the drag conveyor 43 is propelled through the tank 10 by the motor 50.

The scraper 65 (FIGS. 3 to 5) comprises an elongated bar extending lengthwise along one side of the screen 60 and supported by a pair of arms 75 which are secured rigidly to the adjacent shaft 45. The scraper is spaced approximately one-fourth inch from the screen and, as the latter rotates, any accumulated chips move upwardly into contact with the underside of the scraper and are doffed from the screen.

From the foregoing, it will be seen that the screen 60 effectively filters out large chips to prevent the latter from overloading the hydroclones 13 and chewing up the pump 15. With prior arrangements of the same general type, it has been the practice to use the pipe 27 of the T-fitting 29 as the suction inlet for all of the dirty liquid and, as a result, large chips were sucked into the pipe 30 and the pump 15 along with the dirty liquid. With the present arrangement, it is not necessary to use the pipe 27 as the suction inlet and thus a tubular screen 80 may be connected between the open ends of the pipes 26 and 27 as shown in FIGS. 1, 3 and 4. By virtue of the screen 80, large chips are prevented from being sucked from the tank 10 and into the pump 15 through the pipe 27 and yet, at the same time, the pipe 26 is still open to the tank so that air may be bled from the hydroclone flow system when the pump 15 is first started. Even though the screen 80 tends to become clogged with chips after extended service use, this is of no moment since liquid is not required to pass through the screen. Even when clogged, the screen 80 remains sufficiently permeable to permit the bleeding of air from the system.

Because the main suction inlet for the pump 15 is formed by the screened slots 61 rather than by the pipe 27, better settling of chips occurs and particularly when the requirements of the using system are low and/or when the using system is shut down. Under these conditions, most of the liquid which is circulated through the hydroclone system is the excess clean liquid, and the only dirty liquid that is introduced into the system is that which is required as make-up for the liquid passing through the underflow pots 24 and for the liquid (if any) taken by the using system. Accordingly, very little dirty liquid is taken from the tank 10 and thus the tank is quiet and relatively non-turbulent so as to facilitate the settling of chips. The screen 60 filters the large chips out of the small quantity of make-up liquid which is sucked into the pump and, because only a small degree of suction exists within the screen 60 when the make-up requirements are low, the large chips do not tend to collect around the screen and thus are free to settle to the bottom of the tank.

I claim as my invention:

1. Apparatus for separating solid particles out of a flow of dirty liquid from a using system and for delivering a flow of clean liquid to the system, said apparatus having a settling tank for receiving a flow of dirty liquid from the using system, a hydroclone separator operable to receive a flow of dirty liquid from said tank and to discharge a first flow of clean liquid to the using system and a second flow of clean liquid in excess of that required by the using system, a pump having a suction line submerged within said tank and having a discharge line communicating with said separator whereby operation of said pump serves to deliver dirty liquid from said tank to said separator, said suction line having at least one inlet opening, a rotatable tubular screen telescoped over said suction line to filter out large particles from the dirty liquid sucked through the screen and into said inlet opening by said pump, mechanism for power rotating said screen, means positioned adjacent the outer side of said screen for removing large particles from the screen as an incident to rotation thereof, a first pipe communicating with said suction line downstream of said inlet opening and having an open end submerged within said tank, a second pipe for receiving said excess flow of clean liquid from said separator and having a submerged open end spaced from but in line with the open end of said first pipe whereby said excess flow of liquid is directed from said second pipe into said first pipe for delivery to said pump by way of said suction line, and a tubular screen extending between the open ends of said first and second pipes and operable to restrict particles in said tank from being sucked into said first pipe while allowing air to bleed from said second pipe.

2. Apparatus as defined in claim 1 in which said suction line is of circular cross-section and includes a plurality of angularly spaced inlet openings in the form of slots extending axially of said suction line, the total area of said slots being greater than the cross-sectional area of said suction line.

3. Apparatus for separating solid particles out of a flow of dirty liquid from a using system and for delivering a flow of clean liquid to the system, said apparatus having a settling tank for receiving a flow of dirty liquid from the using system, a hydroclone separator operable to receive a flow of dirty liquid from said tank and to discharge a first flow of clean liquid to the using system and a second flow of clean liquid in excess of that required by said using system, a pump having a suction line submerged within said tank and having a discharge line communicating with said separator whereby operation of said pump serves to deliver dirty liquid from said tank to said separator, said suction line having a series of angularly spaced inlet openings; a tubular screen telescoped rotatably over said suction line and surrounding said inlet openings to filter out large particles from the dirty liquid sucked through said screen and into said openings, means for power rotating said screen, a scraper positioned adjacent the outer side of said screen for removing large particles from the screen as an incident to rotation thereof, a first pipe communicating with said suction line downstream of said inlet openings and having an open end submerged within said tank, a second pipe for receiving said excess flow of clean liquid from the separator, said second pipe having a submerged open end spaced from but in line with the open end of said first pipe whereby said excess flow of liquid is directed from said second pipe into said first pipe for delivery to said pump by way of said suction line, and a tubular screen extending between the open ends of said first and second pipes and operable to restrict particles in said tank from flowing into said first pipe while allowing air to bleed from said second pipe.

* * * * *